H. W. DEDMAN.
BORING TOOL.
APPLICATION FILED FEB. 12, 1917.
1,313,371.
Patented Aug. 19, 1919.
2 SHEETS—SHEET 1.
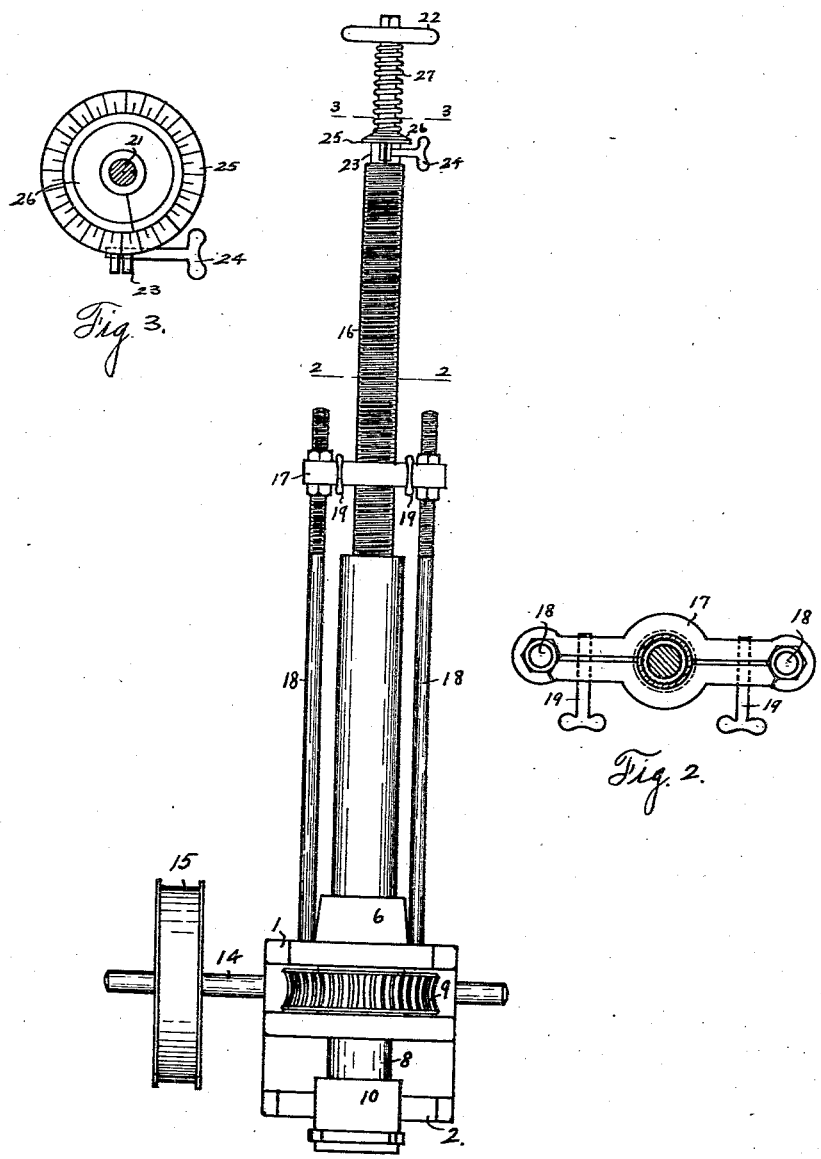

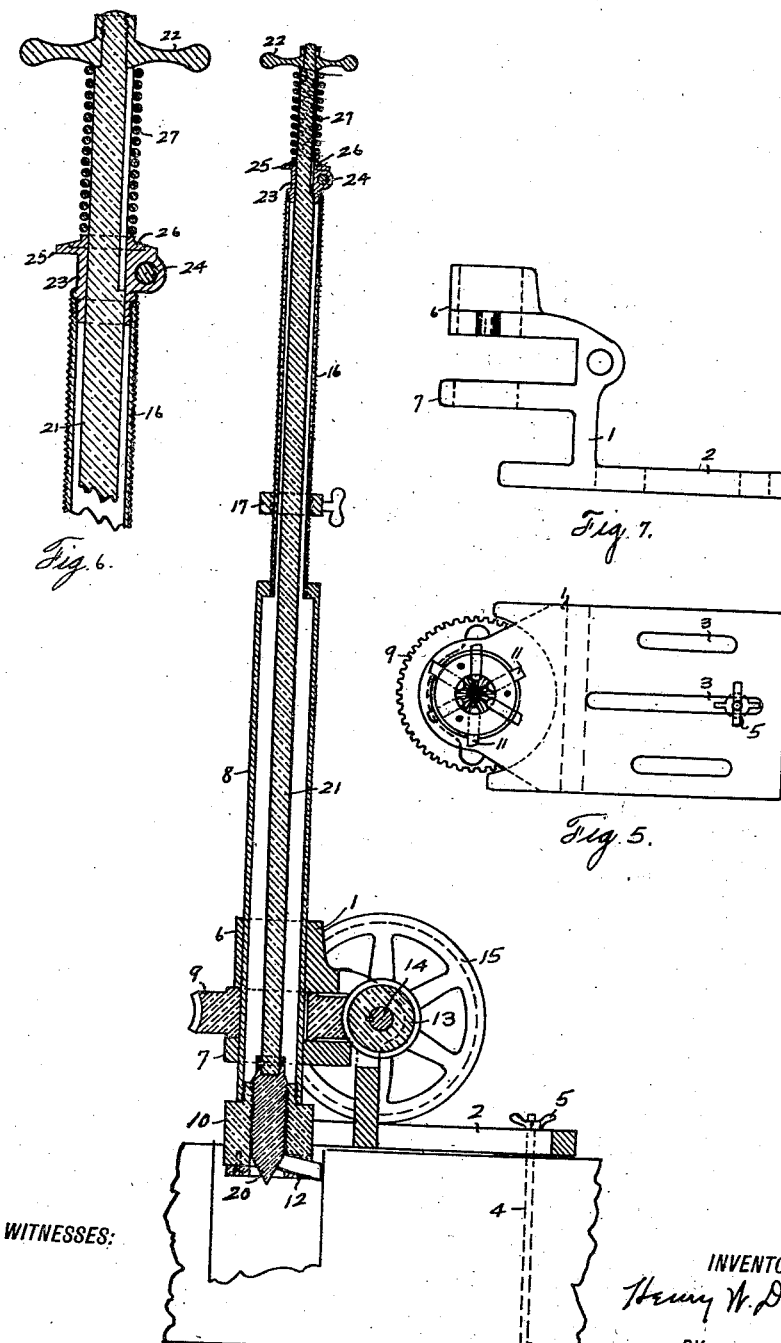

UNITED STATES PATENT OFFICE.

HENRY W. DEDMAN, OF HOUSTON, TEXAS.

BORING-TOOL.

1,313,371.　　　　Specification of Letters Patent.　　Patented Aug. 19, 1919.

Application filed February 12, 1917. Serial No. 148,001.

*To all whom it may concern:*

Be it known that I, HENRY W. DEDMAN, a citizen of the United States, residing at Houston, in the county of Harris and State of Texas, have invented certain new and useful Improvements in Boring-Tools, of which the following is a specification.

This invention relates to new and useful improvements in a boring tool.

The object of the invention is to provide a device of the character described designed particularly for boring out cylinders of internal combustion engines, although it may be used for other similar purposes.

With the above and other objects in view the invention has particular relation to certain novel features of construction, operation and arrangements of parts, an example of which is given in this specification and illustrated in the accompanying drawings, wherein:—

Figure 1 is a side elevation of the device.

Fig. 2 is a transverse sectional view taken on the line 2—2 of Fig. 1.

Fig. 3 is a transverse sectional view taken on the line 3—3 of Fig. 1.

Fig. 4 is a vertical sectional view of the device.

Fig. 5 is a bottom plan view thereof.

Fig. 6 is an enlarged fragmentary vertical sectional view thereof, and

Fig. 7 is a side elevation of the supporting frame.

Referring now more particularly to the drawings, wherein like numerals of reference designate similar parts in each of the figures, the numeral 1 refers to a supporting frame preferably formed of a casting and having the flat base 2 provided with slots 3 therethrough to receive the rod 4, which projects up therethrough and whose upper end is threaded to. receive the nut 5 which may be screwed down against the base and by means of which the frame 1 may be secured relative to the cylinder being operated upon. The frame is provided with vertically alined bearings 6 and 7 in which the sleeve 8 rotates and splined upon said sleeve between said bearings is the worm gear 9. The lower end of this sleeve carries a cutter head 10 having a plurality of radially movable cutters 11. These cutters may be inclined, as shown in Fig. 4, at about a ten degree angle so as to bring the cutting points of the cutters flush with the bottom of the head, and any number of cutters may be employed, although six are shown. The cutters slide in radiating bearings and are held in place by means of the plate 12 which is screwed against the lower end of the cutter head. The worm gear 9 is in mesh with a corresponding worm gear 13 which is carried upon the shaft 14. This shaft is driven from a suitable motor through the pulley 15. Secured to the upper end of the sleeve 8 is the externally threaded tubular shaft 16 which has a threaded engagement with the fixed clamp 17. This clamp is carried by the upper ends of the standard 18, 18, upstanding from the frame and is adjustable thereon. By means of thumb screws 19, 19, the clamp may be opened to permit the vertical movement of the shaft 16 but when closed has a threaded engagement with said shaft. A conical shaped member 20 is threaded vertically through the head 10 and against it the inner ends of the cutters 11 rest. A rod 21 is attached at its lower end to this member and extends up through the sleeve 8 and the shaft 16 and fixed to its upper end is a hand wheel 22 by means of which it may be turned. It is obvious that by turning said rod 21 the member 20 may be screwed downwardly so as to project the cutters 11 out further from the head or it may be turned the reverse direction with the opposite result. Fixed to the upper end of the shaft 16 is the clamp 23 which surrounds and may be clamped to the rod 21 by means of the screw 24. Integral with the upper end of this clamp is a gage disk 25 and surrounding and keyed to the rod 21 is a washer 26 which is held seated in a corresponding bearing in said disk by means of a coil spring 27 interposed between said washer and hand wheel 22 and surrounding the rod 21. The disk 25 is marked or gaged, as shown on Fig. 3 so as to indicate the relative position of the rod 21 when turned.

In use, the device is mounted upon a motor as 28 so as to aline the head 10 above the cylinder to be bored. The clamp 17 is then loosened to permit the head to be lowered into the cylinder. The rod 21 is then turned so as to operate through the conical shaped member 20 to force the cutters 11 out against the cylinder walls on all sides. This will center the cutter head relative to the cylinder. The frame 1 is then fixed firmly in position by screwing the nut 5 down against the base 2. The cutter head is then lifted up clear of the cylinder, the sleeve 8 sliding through the bearings 6 and 7. The clamp 17 is then tightened, bringing it into threaded engagement with the shaft 16, and the rod 21 turned through the hand wheel 22 until the cutters are projected out the required distance, to operate upon and cut away the cylinder walls. Rotation is then imparted to the shaft 14 and through the gears 13 and 9 to the sleeve 8. As said sleeve and the cutter head turn they will gradually be fed downwardly on account of the threaded engagement of said shaft with the clamp 17 and will gradually bore out the cylinder as the cutter head moves downwardly therethrough.

When it is desired to bore out another cylinder, the operation hereinbefore described will be repeated and in order to insure the cylinders being the same size when bored, the rod 21 is turned to the same relative position as will be indicated by the indicating disk 25 as shown in Fig. 3.

What I claim is:

1. A device of the character described including a frame, a sleeve rotatable relative to the frame, a clamp fixed to the frame through which said sleeve is threaded and by which a lengthwise movement is imparted to the sleeve as it rotates, means for releasing the clamp from the sleeve to permit its free lengthwise movement, means for rotating the sleeve, a cutter head fixed to the sleeve, and cutters carried by the head.

2. A device of the character described including a frame having a flat base provided with an oblong bearing, a securing member extending through said bearing by means of which the frame is secured to a support, said bearing admitting of the adjustment of a device relative to the support, alined bearings integral with the base, a sleeve rotatable in said bearings, a cutter head carried by the sleeve, a pair of standards upstanding from said support, a clamp adjustably mounted on the standards, said clamp being internally threaded and engaging around a correspondingly threaded section of said sleeve and operating to move the sleeve lengthwise as it rotates and means for releasing the clamp from said sleeve to permit the free endwise movement of the sleeve.

3. A device of the character described including a frame, a sleeve movable lengthwise relative to the frame, a clamp fixed to the frame, through which said sleeve is threaded and by which a lengthwise movement is imparted to the sleeve as it rotates, means for releasing said clamp from the sleeve to permit the free movement of the sleeve relative to the clamp, means for rotating the sleeve, a cutter head fixed to the sleeve, cutters carried by in the head, and means for locking said last mentioned means against movement relative to the head.

4. A device of the character described including a frame having a flat base provided with an oblong bearing, a securing member extending through said bearing by means of which the frame is secured to a support, said bearing admitting of the adjustment of the device, relative to the support, bearings carried by the frame, a sleeve rotatable in said bearings, a gear splined on the sleeve between said bearings, a means in connection with said gear through which the gear and sleeve are rotated, standards fixed to and upstanding from the frame, an internally threaded clamp, carried by said standards and through which said sleeve is threaded and by means of which a lengthwise movement is imparted to the sleeve as it rotates, means for releasing said clamp from the sleeve to permit the free movement of the sleeve relative to said clamp, a cutter head fixed to the sleeve, cutters radially movable in said head, means carried by the head for forcing said cutters outwardly and means for locking said last mentioned means against movement relative to the head and thereby securing said cutters in their projected position.

In testimony whereof I have signed my name to this specification in the presence of two subscribing witnesses.

HENRY W. DEDMAN.

Witnesses:
 A. C. SPRINGFIELD,
 E. V. HARDWAY.